(12) United States Patent
Kono et al.

(10) Patent No.: US 7,852,022 B2
(45) Date of Patent: Dec. 14, 2010

(54) CONTROL APPARATUS FOR ELECTRIC CAR

(75) Inventors: Masaki Kono, Tokyo (JP); Tsuneyasu Kakizaki, Tokyo (JP)

(73) Assignee: Mitsubishi Electric Corporation, Chiyoda-Ku, Tokyo (JP)

(*) Notice: Subject to any disclaimer, the term of this patent is extended or adjusted under 35 U.S.C. 154(b) by 720 days.

(21) Appl. No.: 11/770,803

(22) Filed: Jun. 29, 2007

(65) Prior Publication Data

US 2008/0169775 A1 Jul. 17, 2008

(30) Foreign Application Priority Data

Jan. 12, 2007 (JP) .............................. 2007-004709

(51) Int. Cl.
*H02P 3/00* (2006.01)
(52) U.S. Cl. ................... 318/135; 318/490; 318/729; 318/803; 318/807; 318/811; 318/818
(58) Field of Classification Search ................ 318/135, 318/490, 729, 803, 807, 811, 818
See application file for complete search history.

(56) References Cited

U.S. PATENT DOCUMENTS

| | | | | | |
|---|---|---|---|---|---|
| 3,772,640 | A | * | 11/1973 | Auer et al. | 246/187 B |
| 5,218,277 | A | * | 6/1993 | Pattison et al. | 318/135 |
| 5,585,709 | A | * | 12/1996 | Jansen et al. | 318/807 |
| 5,811,956 | A | * | 9/1998 | Yamamoto | 318/801 |
| 6,199,023 | B1 | * | 3/2001 | Kliman | 702/67 |
| 6,320,350 | B1 | * | 11/2001 | Take | 318/811 |
| 2004/0051495 | A1 | * | 3/2004 | Kaneko et al. | 318/807 |
| 2008/0018284 | A1 | * | 1/2008 | Kinpara et al. | 318/490 |

FOREIGN PATENT DOCUMENTS

| | | | |
|---|---|---|---|
| JP | 06-153568 A | | 5/1994 |
| JP | 2003284398 A | * | 10/2003 |
| WO | WO 2006008846 A1 | * | 1/2006 |

OTHER PUBLICATIONS

Machine translation of JP 2003284398 A.*

* cited by examiner

*Primary Examiner*—Walter Benson
*Assistant Examiner*—Kawing Chan
(74) *Attorney, Agent, or Firm*—Buchanan Ingersoll & Rooney PC

(57) ABSTRACT

A control apparatus for an electric car, including a power converter which feeds AC power of variable voltage and variable frequency to a primary side member of a linear electromagnetic actuator, voltage command means for giving a command of a voltage which is fed to the linear electromagnetic actuator, current detection means for detecting current information which flows between the power converter and the linear electromagnetic actuator, and motor constant calculation means for calculating a motor constant of the linear electromagnetic actuator on the basis of the voltage information Vu given by the voltage command means and the current information Iu detected by the current detection means.

7 Claims, 4 Drawing Sheets

CONTROL APPARATUS FOR ELECTRIC CAR

BACKGROUND OF THE INVENTION

1. Field of the Invention

This invention relates to a control apparatus for an electric car. More particularly, it relates to a control apparatus for an electric car wherein a linear electromagnetic actuator such as linear induction motor is driven and controlled by employing a power converter of variable voltage and variable frequency, which apparatus has a motor constant measurement function capable of easily measuring the motor constants of the primary side or secondary side of the linear electromagnetic actuator.

2. Description of the Related Art

As disclosed in, for example, JP-A-6-153568 (Patent Document 1), in an induction motor of rotary type, there has been generally known a constant measurement method for the induction motor wherein the constants of the induction motor for use in a vector control can be measured by only a winding resistance measurement and a constraint test.

However, in a control apparatus for an electric car such as a linear induction motor or the like comprising linear electromagnetic actuator in which motor constituents are disposed on a flat surface, a stator on a primary side and a rotor on a secondary side as termed in the rotary type induction motor are separated, and hence, the constants of the induction motor for use in a vector control are difficult of measurement.

SUMMARY OF THE INVENTION

This invention eliminates the problem of the prior art that the constants of a motor for use in a vector control are difficult of measurement in a control apparatus for an electric car as includes the linear induction motor or the like linear electromagnetic actuator, and it has for its object to obtain a control apparatus for an electric car as has a motor constant measurement function which can easily and reliably calculate the motor constants of the primary side or secondary side of the linear electromagnetic actuator, and in turn, which can perform the high-performance control of the linear electromagnetic actuator, such as the vector control of the linear induction motor, by using the measured motor constants.

A control apparatus for an electric car according to this invention is a control apparatus for an electric car whose drive source is a linear electromagnetic actuator carried on a car body of the electric car. In the control apparatus, a power converter feeds AC power of variable voltage and variable frequency to a primary side member constituting a primary conductor of the linear electromagnetic actuator. Voltage command means gives a command of an output voltage which the power converter feeds to the linear electromagnetic actuator. Current detection means detects current information which flows between the power converter and the linear electromagnetic actuator. And, motor constant calculation means calculates a motor constant of the linear electromagnetic actuator on the basis of the voltage information given by the voltage command means and the current information detected by the current detection means, when the electric car is held stopped by a brake device which is actuated by a stop signal.

Besides, a control apparatus for an electric car according to this invention is a control apparatus for an electric car whose drive source is a linear electromagnetic actuator that includes a primary side member carried on a car body of the electric car and constituting a primary conductor of the linear electromagnetic actuator, and a secondary side member arranged on a ground side and constituting a secondary conductor of the linear electromagnetic actuator. In the control apparatus, a power converter feeds AC power of variable voltage and variable frequency to the linear electromagnetic actuator. Voltage command means gives a command of an output voltage which the power converter feeds to the linear electromagnetic actuator. Current detection means detects current information which flows between the power converter and the linear electromagnetic actuator. And, motor constant calculation means calculates a motor constant of the linear electromagnetic actuator on the basis of the voltage information given by the voltage command means and the current information detected by the current detection means, when the electric car is held stopped by a brake device which is actuated by a stop signal.

According to the control apparatus for the electric car in this invention, it is possible to obtain a control apparatus for an electric car as has a function capable of measuring the motor constant of the primary side or secondary side of the linear electromagnetic actuator easily and reliably.

Another advantage is that the high-performance control of the linear electromagnetic actuator, such as the vector control of a linear induction motor, can be performed using the measured motor constant.

The foregoing and other objects, features, aspects and advantages of this invention will become more apparent from the following detailed description of this invention when taken in conjunction with the accompanying drawings.

DESCRIPTION OF THE PREFERRED EMBODIMENTS

Embodiment 1

Now, Embodiment 1 of this invention will be described with reference to FIGS. 1 to 4.

Figure 1:
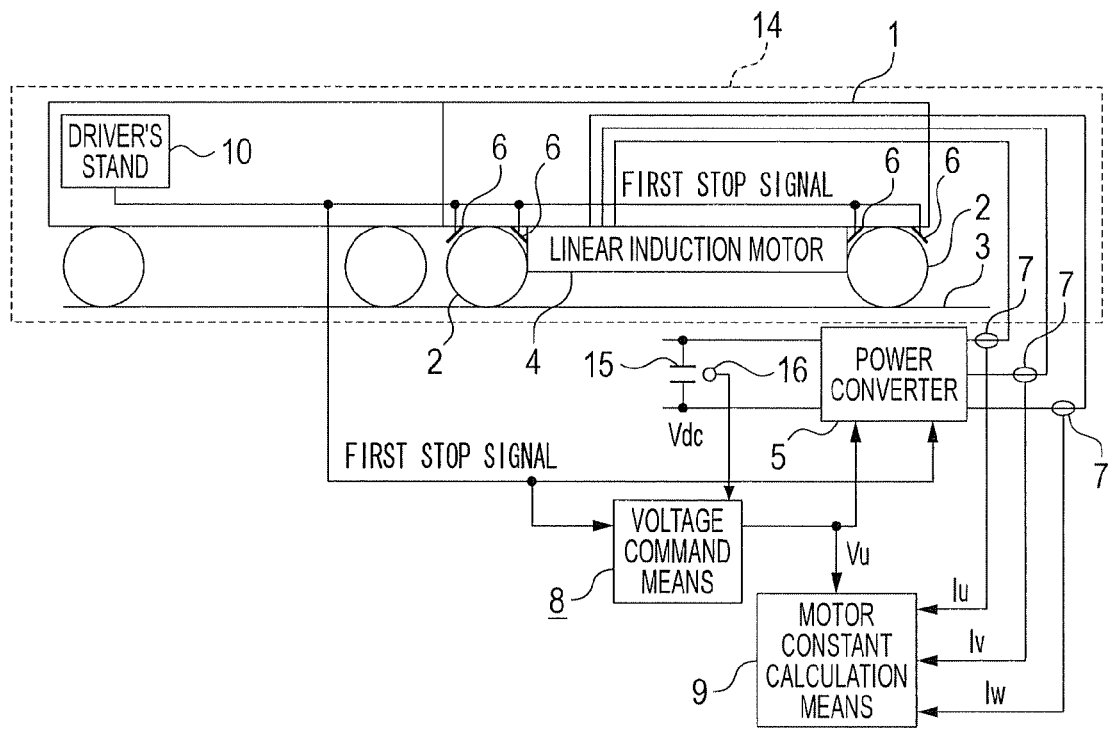
FIG. 1 is a schematic configurational diagram showing the whole configuration of a control apparatus for an electric car in Embodiment 1 of this invention.

FIG. 1 is a schematic configurational diagram showing the whole configuration of a control apparatus for an electric car according to Embodiment 1 of this invention. Referring to FIG. 1, numeral 1 designates a car body, which constitutes the electric car 14 together with wheels 2. Numeral 3 designates rails, and numeral 4 a linear induction motor (hereinbelow, also termed "linear motor" simply) which is a linear electromagnetic actuator carried on the car body 1. The control apparatus also includes a power converter 5 which feeds three-phase AC power of variable voltage and variable frequency to the linear induction motor 4, mechanical brakes 6 which mechanically stop the electric car 14 on the basis of a first stop signal from the driver's stand 10 of this electric car, and current detection means 7 for detecting current information items which flow between the linear induction motor 4 and the power converter 5. The current detection means 7 detect phase currents Iu, Iv and Iw which flow through the linear induction motor 4. By the way, in FIG. 1, the current detection means 7 are so illustrated that the currents which flow through circuits connecting the power converter 5 and the linear induction motor 4 are detected by CTs, but the phase currents may well be detected on the basis of bus currents or the like currents flowing within the power converter 5, by employing another known technique. Besides, since the relation of Iu+Iv+Iw=0 holds, the current of the w-phase can be evaluated from the detection currents of the two phases; u-phase and v-phase, and hence, the current detection means 7 of the w-phase may well be omitted.

Numeral 8 indicates voltage command means for outputting any desired voltage between the linear induction motor 4 and the power converter 5, and the details of this means will be explained later.

Motor constant calculation means 9 calculates the motor constants of the linear induction motor 4 on the basis of voltage information Vu based on the voltage command means 8 and the current information Iu detected by the current detection means 7, when the electric car 14 is held stopped by the mechanical brakes 6. Voltage detection means 16 detects a voltage Vdc across a capacitor 15 which is mounted on the DC side of the power converter 5, and the detected voltage Vdc is inputted to the voltage command means 8.

Figure 2:
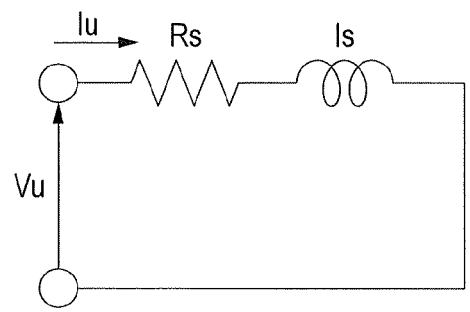
FIG. 2 is an equivalent circuit diagram of a linear induction motor in Embodiment 1 of this invention.

FIG. 2 shows the equivalent circuit of the linear motor of the control apparatus for the electric car as is configured as shown in FIG. 1. Since a reaction plate does not exist in FIG. 1, the equivalent circuit is constituted by a primary resistance Rs and a primary leakage inductance ls. In Embodiment 1, therefore, the primary leakage inductance ls is measured by applying the AC voltage Vu to the linear induction motor 4.

Here, the primary resistance Rs can be easily measured by a measuring instrument such as tester or impedance analyzer. In Embodiment 1, therefore, the primary resistance Rs is assumed to have a known value.

Since the primary resistance Rs is known, the primary leakage inductance ls is calculated in such a way that the output voltage information Vu is given to the power converter 5 by the voltage command means 8, and that the AC voltage from the power converter 5 is applied to the linear induction motor 4.

Next, the configuration and operation of the voltage command means 8 will be described with reference to FIGS. 3 and 4.

Figure 3:
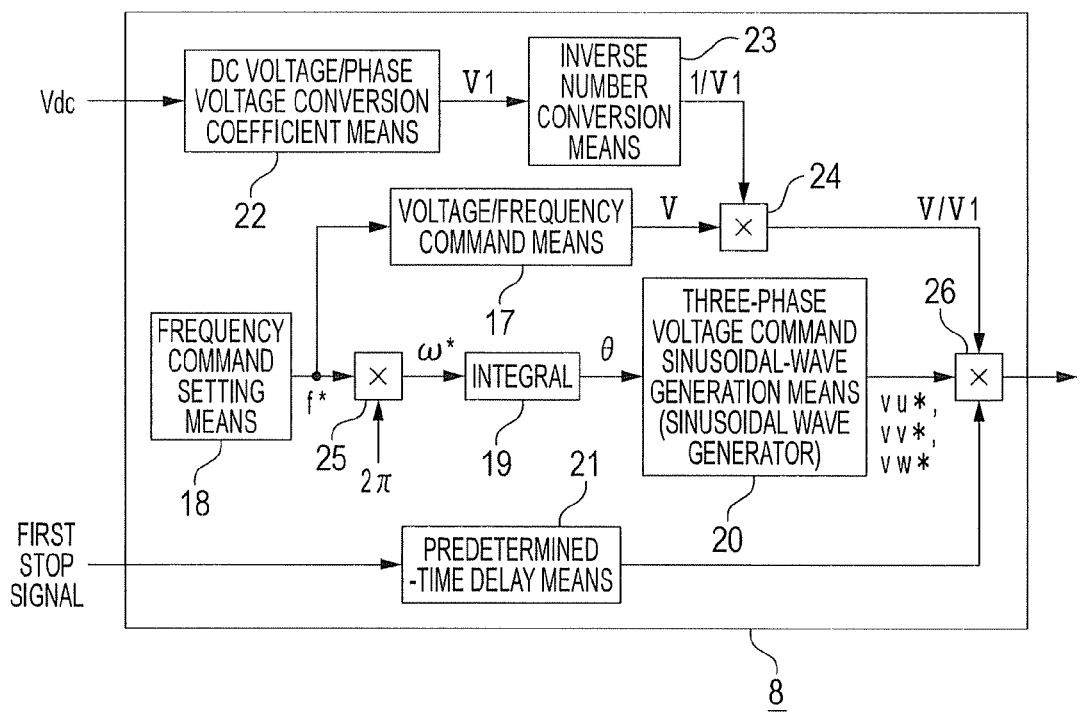
FIG. 3 is a diagram showing an example of the configuration of voltage command means in Embodiment 1 of this invention.

Referring to FIG. 3, the DC voltage Vdc detected by the voltage detection means 16 is inputted to DC voltage/phase voltage conversion coefficient means 22, by which the DC voltage Vdc is converted into a value V1 that corresponds to the phase voltage to be applied to the linear induction motor 4.

More specifically, the DC voltage/phase voltage conversion coefficient means 22 executes a calculation conforming to the following formula (1), thereby to convert the DC voltage Vdc into the value V1 corresponding to the phase voltage which is applied to the linear induction motor 4:

$$V1 = \frac{2}{\pi} Vdc \quad (1)$$

The output V1 of the DC voltage/phase voltage conversion coefficient means 22 is inputted to inverse number conversion means 23. The inverse number conversion means 23 calculates 1/V1 which is the inverse number of the value V1, in conformity with the following formula (2):

$$V2 = \frac{1}{V1} \quad (2)$$

The output 1/V1 of the inverse number conversion means 23 is inputted to a multiplier unit 24.

On the other hand, frequency command setting means 18 sets the frequency command f* [Hz] of the voltage to be applied to the linear induction motor 4, and it outputs the frequency command f* to voltage/frequency command means 17 and a multiplier unit 25.

The frequency command f* [Hz] inputted to the voltage/frequency command means 17 is converted into the amplitude V of the voltage to be applied to the linear induction motor 4, and the voltage amplitude V is thereafter outputted to the multiplier unit 24.

The multiplier unit 24 multiplies the output 1/V1 of the inverse number conversion means 23 and the voltage amplitude V being the output of the voltage/frequency command means 17, and it outputs the resulting product V/V1 to a multiplier unit 26.

Incidentally, the output value V/V1 of the multiplier unit 24 is a value which corresponds to the modulation factor or voltage utilization factor of the voltage to be applied to the linear induction motor 4.

Besides, the frequency command f* [Hz] inputted to the multiplier unit 25 is multiplied by 2π as indicated by the following formula (3), whereby a unit conversion into an angular frequency command ω* [rad/sec] is made:

$$\omega^* = 2\pi \times f^* \quad (3)$$

The angular frequency command ω* is outputted to an integral unit 19 and is converted into a phase θ [rad] in conformity with the following formula (4), and the phase θ is outputted to three-phase voltage command sinusoidal-wave generation means 20:

$$\theta = \int \omega^* dt \quad (4)$$

In the three-phase voltage command sinusoidal-wave generation means 20, three-phase voltages shifting ±2π/3, to be applied to the linear induction motor 4 as indicated by the following formula (5) are generated on the basis of the "sin" function and the phase η:

$$v_u^* = \sin(\theta) \quad (5)$$
$$v_v^* = \sin\left(\theta - \frac{2\pi}{3}\right)$$
$$v_w^* = \sin\left(\theta + \frac{2\pi}{3}\right)$$

Of course, the three-phase voltage command sinusoidal-wave generation means 20 may well generate three-phase voltages shifting ±2π/3, to be applied to the linear induction motor 4 as indicated by the following formula (6), on the basis of the "cos" function and the phase θ:

$$v_u^* = \cos(\theta)$$
$$v_v^* = \cos\left(\theta - \frac{2\pi}{3}\right)$$
$$v_w^* = \cos\left(\theta + \frac{2\pi}{3}\right)$$

(6)

Incidentally, it is needless to say that, in order to relieve the processing capability of a microcomputer, table data may well be set by approximating the "sin" or "cos" function, in simplified fashion.

Further, the output values vu*, vv* and vw* of the three-phase voltage command sinusoidal-wave generation means 20 are inputted to the multiplier unit 26.

Figure 4:
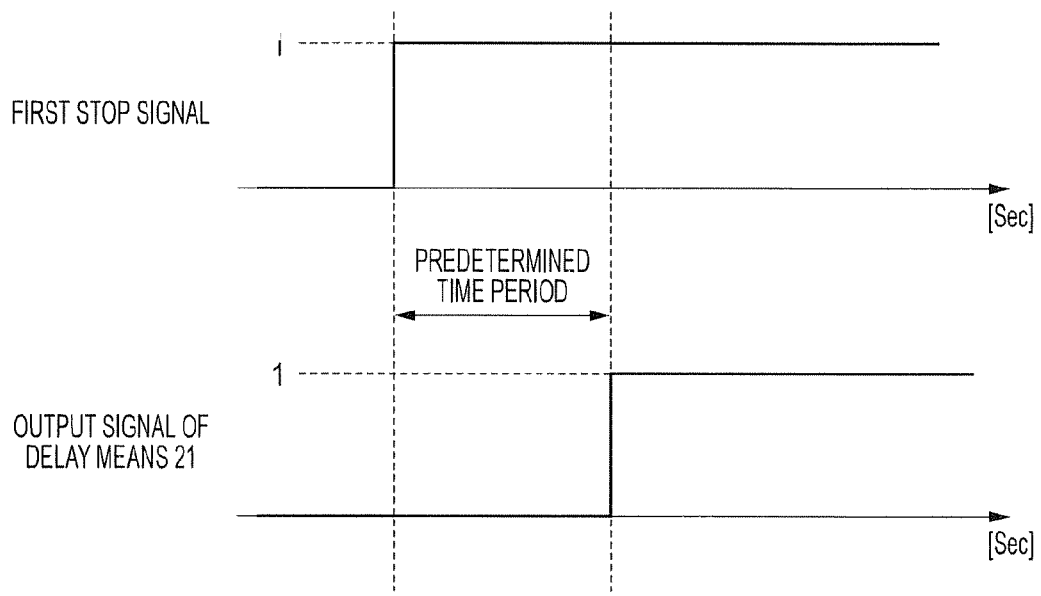
FIG. 4 is a diagram showing the relationship between a first stop signal and the output signal of predetermined-time delay means in Embodiment 1 of this invention.

Besides, the first stop signal inputted from the driver's stand 10 to the voltage command means 8 is inputted to predetermined-time delay means 21 and is converted by this predetermined-time delay means 21 into an output signal (of binary value of "0" or "1") which has been delayed a predetermined time period relative to the first stop signal as shown in FIG. 4. The output signal is inputted to the multiplier unit 26.

In the multiplier unit 26, all of the output value V/V1 of the multiplier unit 24, the output values vu*, vv* and vw* of the three-phase voltage command sinusoidal-wave generation means 20 and the output signal (of the binary value of "0" or "1") of the predetermined-time delay means 21 are multiplied, thereby to obtain voltage commands Vu, Vv and Vw. Besides, the voltage commands Vu, Vv and Vw are outputted to the power converter 5.

The power converter 5 applies the three-phase AC voltages to the linear induction motor 4 in accordance with the output values of the voltage command means 8.

Incidentally, the reason why the first stop signal is delayed the predetermined time period as stated above is as follows: The first stop signal from the driver's stand 10 serves to operate the mechanical brakes 6. In general, the mechanical brakes 6 have a scheme wherein compressed air is fed to a brake cylinder, and a brake pad being an iron-made plate is mechanically pressed by a pneumatic pressure control. Therefore, the mechanical brakes 6 are low in a response speed. In contrast, the power converter 5 performs an electrical operation and is therefore high in the response speed. In order to precisely measure the motor constant, the measurement needs to be performed after the motor 4 has stopped. For this purpose, the control apparatus is so configured that, after the electric car 14 has been reliably stopped by operating the mechanical brakes 6 with the first stop signal, the voltage command means 8 is operated after the delay of the predetermined time period based on the predetermined-time delay means 21, so as to operate the power converter 5.

Next, the operation of the motor constant calculation means 9 will be described.

The motor constant calculation means 9 calculates the primary leakage inductance ls being the motor constant, by employing Formulas (7) and (8) given below.

More specifically, in view of the equivalent circuit in FIG. 2, the current Iu is caused to flow by applying the voltage Vu to the linear induction motor 4, and the following formula (7) holds:

$$Vu = Rs \cdot Iu + \omega^* \cdot ls \cdot Iu$$ (7)

Here, the angular frequency command ω* agrees with the frequency of the voltage which the power converter 5 outputs, so that ω*=2πf* holds. Therefore, Formula (7) can be solved as the following formula (8) for the primary leakage inductance ls:

$$ls = \frac{1}{2 \cdot \pi \cdot f^*}\left(\frac{Vu}{Iu} - Rs\right)$$ (8)

Accordingly, the motor constant calculation means 9 can calculate the primary leakage inductance ls from the output voltage command Vu of the voltage command means 8 and the current Iu by employing Formula (8).

Figure 8:
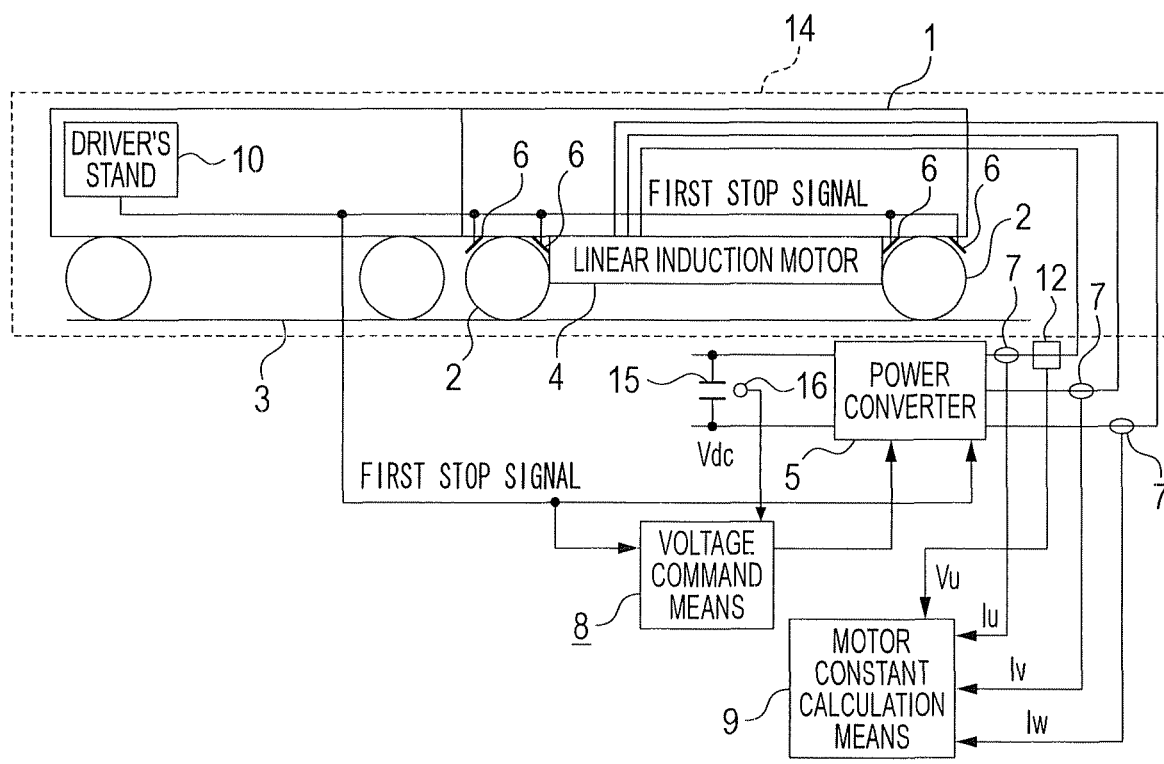
FIG. 8 is a configurational diagram showing a modification to a voltage input to motor constant calculation means in Embodiment 1 of this invention.

By the way, in the above, the voltage Vu has been described concerning the case where the voltage command being the output of the voltage command means 8 is used. However, this is not restrictive, but as shown in FIG. 8 byway of example, the actual output voltage of the power converter 5 can also be detected by a voltage sensor 12, so as to calculate the primary leakage inductance ls in conformity with Formula (8). When the voltage sensor 12 is utilized in this manner, the actual voltage which is applied to the linear induction motor 4 can be measured, and the influence of a voltage lowering which is caused by a voltage drop ascribable to a switching element constituting the power converter 5, the influence of the dead time of the element, etc. can be removed, so that a stricter constant measurement becomes possible.

Besides, Embodiment 1 has been described concerning the case where the linear induction motor is employed as the linear electromagnetic actuator. Of course, however, this invention is not restricted to the linear induction motor, but it is applicable to any linear electromagnetic actuator in which an inductance L and a resistance R are included as constituents, for example, a linear DC motor, a linear pulse motor, a linear vibration actuator, a linear electromagnetic solenoid, a linear electromagnetic pump, a linear synchronous motor or a linear hybrid motor.

As described above, according to Embodiment 1 of this invention, it is possible to easily measure the primary leakage inductance ls which is the motor constant of the primary side of the induction motor being the linear electromagnetic actuator applied to the electric car.

Another advantage is that the high-performance control of the linear electromagnetic actuator, such as the vector control of the linear induction motor, can be performed using the measured motor constant.

Embodiment 2

Figure 5:
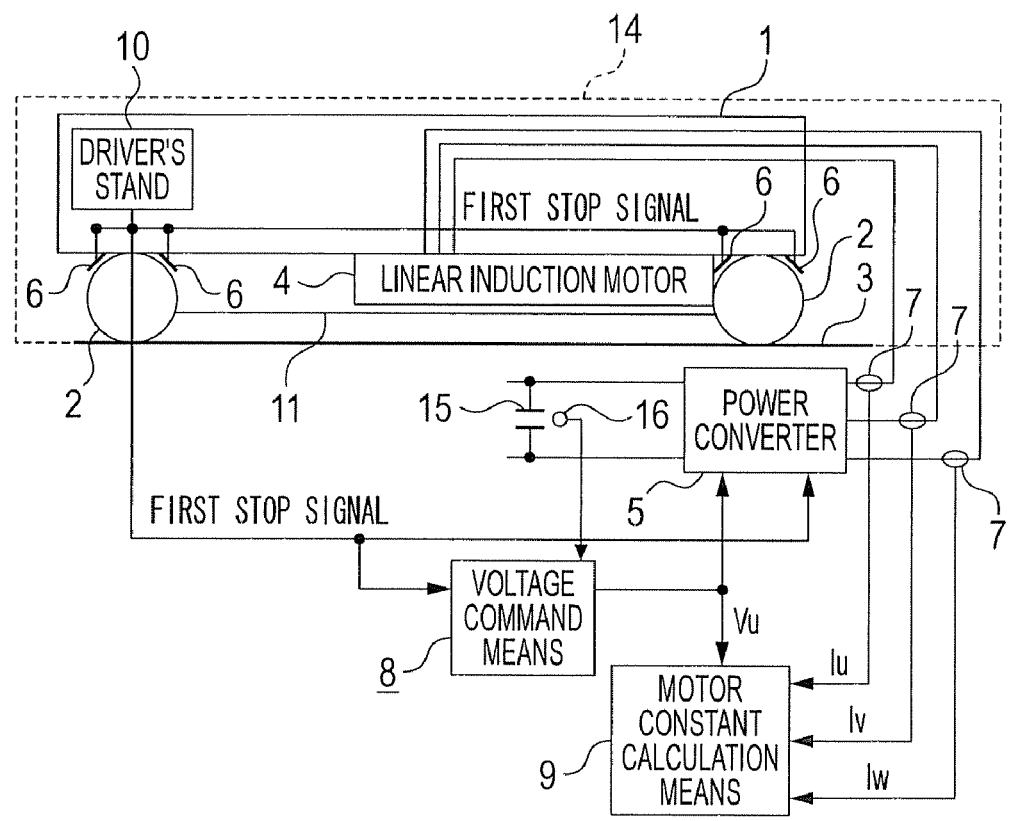
FIG. 5 is a schematic configurational diagram showing the whole configuration of a control apparatus for an electric car in Embodiment 2 of this invention.

FIG. 5 is a schematic configurational diagram showing the whole configuration of a control apparatus for an electric car in Embodiment 2 of this invention.

Incidentally, the same portions as in Embodiment 1 stated above are assigned the same numerals and signs in the figure and shall be omitted from description, and only different portions will be explained here.

The point of difference of Embodiment 2 from Embodiment 1 is that a reaction plate 11 which forms the secondary side conductor of a linear induction motor 4 being a linear electromagnetic actuator is arranged on a ground side.

Figure 6:
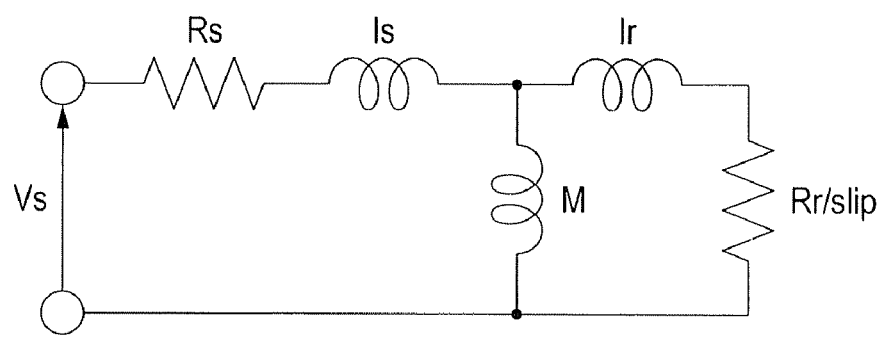
FIG. 6 is an equivalent circuit diagram of a general induction motor of rotary type.
Figure 7:
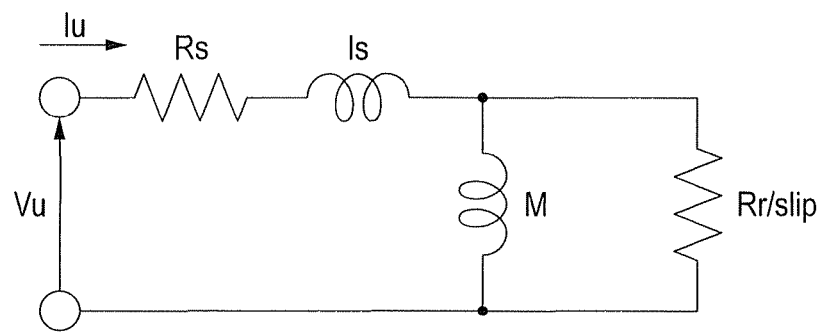
FIG. 7 is an equivalent circuit diagram of a linear induction motor in Embodiment 2 of this invention.

The equivalent circuit of a general induction motor of rotary type becomes as shown in FIG. 6. In the linear induction motor 4 configured as indicated in Embodiment 2, however, a secondary leakage inductance lr is almost zero, and hence, the equivalent circuit of this induction motor can be represented as shown in FIG. 7. In Embodiment 2, therefore, a secondary resistance Rr which is required for a high-performance control such as vector control can be measured in view of the equivalent circuit in FIG. 7.

More specifically, the frequency command f* of the frequency command setting means 18 (refer to FIG. 3) of voltage command means 8 is set at a high frequency. Thus, in FIG. 7, the impedance of a mutual inductance M heightens, any current does not flow through the mutual inductance M, and a current flows through only the secondary resistance Rr.

By way of example, the frequency command f* of the frequency command setting means 18 of the voltage command means 8 is set to be, at least, 1 kHz and to be, at most, 10 kHz. The frequency command f* is set at, at least, 1 kHz, whereby the impedance can be sufficiently heightened so as to prevent any current from flowing through the mutual impedance M. Thus, the secondary resistance Rr can be measured by motor constant calculation means 9 as will be explained later.

Incidentally, the reason why the frequency command f* is set at, at most, 10 kHz is that, since the voltage command means 8 and the motor constant calculation means 9 are usually incarnated by a microcomputer, setting this frequency command to be higher than 10 kHz is difficult in point of the performance of the processing time of the microcomputer.

Next, the operation of the motor constant calculation means 9 will be described.

The motor constant calculation means 9 calculates the secondary resistance Rr being a motor constant, by employing Formulas (9) and (10) given below, on the basis of the above idea.

In view of the equivalent circuit in FIG. 7, a current Iu is caused to flow by applying a voltage Vu to the linear induction motor 4, and the following formula (9) holds:

$$Vu=(Rs+Rr)\cdot Iu+\omega^*\cdot ls\cdot Iu \qquad (9)$$

Incidentally, $\omega^*=2\cdot\pi\cdot f^*$ is held.

Subsequently, the secondary resistance Rr can be calculated by reducing Formula (9) into the following formula (10):

$$Rr=\frac{Vu}{Iu}-\omega^*\cdot ls-Rs \qquad (10)$$

In this manner, the motor constant calculation means 9 can calculate the secondary resistance Rr from the output voltage command Vu of the voltage command means 8 and the current Iu in conformity with the Formula (10).

Incidentally, as stated in Embodiment 1, it is a matter of course that a voltage actually applied to the linear induction motor 4 and detected by a voltage sensor may well be used as the voltage command Vu.

Besides, in the voltage command means 8, the frequency command f* can output a DC voltage by setting the frequency at f=0, and any current can be prevented from flowing through a primary leakage inductance ls and the mutual inductance M. In this case, the value of (a primary resistance Rs+ the secondary resistance Rr) can be calculated from the voltage and the current, and the component of the primary resistance Rs being known is subtracted from the value, whereby the secondary resistance Rr can be calculated.

As described above, according to Embodiment 2 of this invention, it is possible to easily measure the secondary resistance Rr which is the motor constant of the secondary side of the induction motor being the linear electromagnetic actuator applied to the electric car.

Another advantage is that the high-performance control of the linear electromagnetic actuator, such as the vector control of the linear induction motor, can be performed using the measured motor constant.

Various modifications and alterations of this invention will be apparent to those skilled in the art without departing from the scope and spirit of this invention, and it should be understood that this invention is not limited to the illustrative embodiments set forth herein.

What is claimed is:

1. A control apparatus for an electric car whose drive source is a linear electromagnetic actuator carried on a car body of the electric car, comprising a power converter which feeds three-phase AC power of variable voltage and variable frequency to a primary side member constituting a primary conductor of the linear electromagnetic actuator, voltage command means for giving a command of an output voltage which said power converter feeds to the linear electromagnetic actuator, current detection means for detecting current information which flows between said power converter and the linear electromagnetic actuator, and motor constant calculation means for calculating a motor constant of the linear electromagnetic actuator on the basis of the voltage information given by said voltage command means and the current information detected by said current detection means, when the electric car is held stopped by a brake device which is actuated by a stop signal.

2. A control apparatus for an electric car as defined in claim 1, wherein the linear electromagnetic actuator is a linear induction motor, and said motor constant calculation means measures a primary leakage inductance of the primary side member.

3. A control apparatus for an electric car as defined in claim 1, wherein the brake device is actuated by the stop signal of the electric car, thereby to stop the electric car, said voltage command means includes delay means for delaying the stop signal a predetermined time period and then outputting an activation signal, and said power converter has its operation started by the activation signal outputted from said delay means.

4. A control apparatus for an electric car whose drive source is a linear electromagnetic actuator that includes a primary side member carried on a car body of the electric car and constituting a primary conductor of the linear electromagnetic actuator, and a secondary side member arranged on a ground side and constituting a secondary conductor of the linear electromagnetic actuator, comprising a power converter which feeds three-phase AC power of variable voltage and variable frequency to the linear electromagnetic actuator, voltage command means for giving a command of an output voltage which said power converter feeds to the linear electromagnetic actuator, current detection means for detecting current information which flows between said power converter and the linear electromagnetic actuator, and motor constant calculation means for calculating a motor constant of the linear electromagnetic actuator on the basis of the voltage information given by said voltage command means and the current information detected by said current detection means, when the electric car is held stopped by a brake device which is actuated by a stop signal.

5. A control apparatus for an electric car as defined in claim 4, wherein the linear electromagnetic actuator is a linear induction motor, the secondary side member is a reaction plate, and said motor constant calculation means measures a secondary resistance of the secondary side member.

6. A control apparatus for an electric car as defined in claim 4, wherein said voltage command means gives the command, thereby enabling said power converter to output a high-frequency voltage of, at least, 1 kHz.

7. A control apparatus for an electric car as defined in claim 4, wherein the brake device is actuated by the stop signal of the electric car, thereby to stop the electric car, said voltage command means includes delay means for delaying the stop signal a predetermined time period and then outputting an activation signal, and said power converter has its operation started by the activation signal outputted from said delay means.

* * * * *